United States Patent [19]

Verboom

[11] Patent Number: 4,740,944

[45] Date of Patent: Apr. 26, 1988

[54] OPTICAL DISK PHASE LOCK LOOP WITH COMB FILTER

[75] Inventor: Johannes J. Verboom, Colorado Springs, Colo.

[73] Assignee: Laser Magnetic Storage International Company, Colorado Springs, Colo.

[21] Appl. No.: 52,773

[22] Filed: May 21, 1987

Related U.S. Application Data

[63] Continuation of Ser. No. 702,535, Feb. 19, 1985, abandoned.

[51] Int. Cl.⁴ .............................................. G11B 7/00
[52] U.S. Cl. ...................................... 369/59; 369/47; 369/124; 375/76
[58] Field of Search ................ 369/44, 47, 48, 50, 369/124, 59; 360/70, 46; 358/314, 327, 329, 336, 339, 31, 36, 340; 307/511, 552, 556, 608; 328/167, 173; 375/76, 120

[56] References Cited

U.S. PATENT DOCUMENTS

| | | | |
|---|---|---|---|
| 3,947,636 | 3/1976 | Edgar | 369/48 |
| 4,168,496 | 9/1979 | Lichtblau | 340/572 |
| 4,250,453 | 2/1981 | Nilsson | 328/167 |
| 4,414,586 | 11/1983 | Hirota et al. | 360/70 |
| 4,509,155 | 4/1985 | Masuda et al. | 369/48 |
| 4,641,324 | 2/1987 | Karsh et al. | 375/76 |
| 4,646,281 | 2/1987 | Verboom | 369/59 |

FOREIGN PATENT DOCUMENTS 099576  1/1984  European Pat. Off. .

OTHER PUBLICATIONS

Cackowski et al., "Pulse Detector", IBM Tech. Disc. Bul., vol. 7, No. 5, Oct. 1964, pp. 344–345.

Primary Examiner—Donald McElheny, Jr.
Attorney, Agent, or Firm—Sheridan, Ross & McIntosh

[57] ABSTRACT

The read signal input to the phase lock loop, which tracks the prerecorded clock of an optical disk digital recording and playback system, is first filtered using a comb filter to reduce effects caused by the loss of the prerecorded clock signal due to data holes which erase the prerecorded clock and cause relatively large and long lasting, unipotential read signals.

4 Claims, 1 Drawing Sheet

OPTICAL DISK PHASE LOCK LOOP WITH COMB FILTER

This is a continuation, of application Ser. No. 06/702,535, filed Feb. 19, 1985, abandoned.

BACKGROUND OF THE INVENTION

1. Field of the Invention

The invention relates to the field of digital optical disk recording systems and more particularly to their apparatus for recovering prerecorded clock signals on readback of data, and in particular, their phase lock loop circuits.

2. Brief Description of the Prior Art

Some digital optical recording systems have a prerecorded clock in the groove or track in which the digital information is also recorded. The prerecorded clock signal is intended to be used both for recording and reading data back. However, when data is recorded, it erases portions of the prerecorded clock when the holes representative of the data are burned or melted into the recording surface.

In optical systems where a reflected laser beam is the read back signal, the inversion of the read signal for data holes is a relatively high amplitude and long lasting unipotential signal. Holes are typically centered on a zero crossing of the clock signal, but may extend over more than one entire clock period for a single hole, and more than one hole may be written consecutively. Moreover, due to limitations in the optical system wherein the laser beam spot size is itself nearly the same size as the hole it is attempting to detect, the signal due to the hole spreads with a significant amplitude one to two clock periods beyond its edge.

The substitution of a relatively high amplitude, unipotential data signal for the prerecorded clock causes obvious problems for phase lock loop circuits attempting to lock onto the prerecorded clock signal on readback of data. Phase lock loop circuits depend upon phase detectors coupled to a uniformly varying signal. The inclusion of a large and long lasting unipotential signal in its input will cause such a detector to drift to an undesirable degree The typical phase lock loop circuit of the prior art optical recorder has included a bandpass filter just prior to its input to filter out the data signals. These bandpass filters are effective to a degree because the data is recorded in a code which has a null in its power fequency spectrum at the frequency of the prerecorded clock. However, the bandpass filter does not affect the unipotential nature of the signal passed through, and therefore does not completely solve the problem of phase lock loop drift.

SUMMARY OF THE INVENTION

The invention comprises the use of a "comb" filter of unique design just prior to the input to the phase lock loop. The read signal is comprised of a positive and a negative signal, each of which vary sinusoidally upon reading of the prerecorded clock signal. These signals are provided as one set of inputs into a differential amplifier, the outputs of which are provided to the the phase lock loop. At least one of the signals is also provided to a delay circuit which delays the signal by one half the period of the prerecorded clock. The output of the delay is also provided to an input of the differential amplifier, however to the opposite polarity input. Thus the inputs to the differential amplifier are the summation of the read signal and its inversion delayed by one half the clock period. This delay and inversion has no effect on the clock signal, but causes the large unipotential signal to invert and negatively add with itself such that the unipotential signal will always result in equal and opposite signals out of the differential amplifier. The equal and opposite instead of the unipotential data signals reduces drift of the phase lock loop by causing equal and opposite drifts.

DESCRIPTION OF THE PREFERRED EMBODIMENT

Figure 1A:
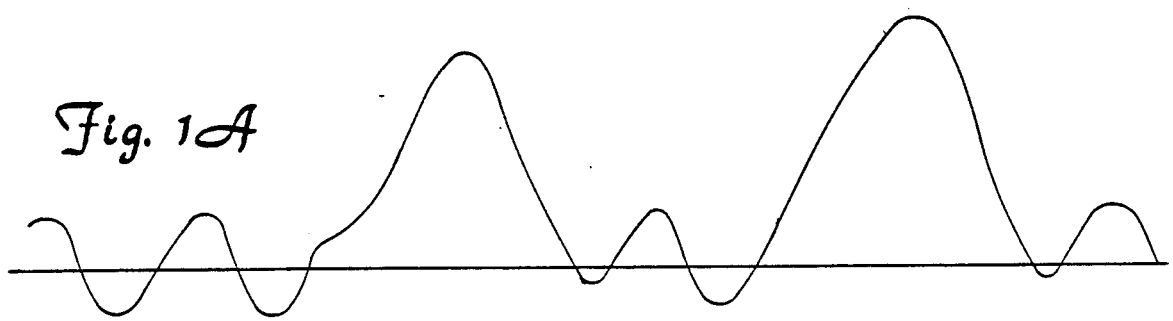
FIG. 1a shows a read signal pattern comprising a prerecored clock signal and the signals caused by two data holes.

FIG. 1a shows a representative read signal out of a differential amplifier, the inputs of which are a differential read signal detected from a laser beam reflecting from the surface of optical disk recorder having data and a prerecorded clock recorded in its tracks. The sinusoidal signal portion of the curve represents the prerecorded clock, which comprises uniformly varying depths in a groove or track in the disk surface. The entire surface of the track is coated with a reflective material, therefore the reflection from the prerecorded track represents variations in reflection, not a total loss in reflection. The two large, long, unipotential signals represent the inversion of the read signal caused by a hole recorded in the track. The hole removes reflective material from the track and erases the prerecorded clock. Each hole may erase the prerecoded clock over more than one clock period, and more than one hole may be recorded in a row. Furthermore, the laser beam spot detecting the hole is typically about the same size as a single hole. This causes the drop in reflection caused by a hole to extend to a significant degree one to two clock periods beyond the edges on a hole.

A phase lock loop attempting to lock onto the prerecorded clock of this read signal will drift to a significant extent and limit the decoding accuracy of detection apparatus which depends upon the output of the phase lock loop to correctly locate the centers of holes. The problems is caused not only by loss of the prerecorded clock, but also because of the presence of a large unipotential signal which causes the phase lock loop to drift rapidly in one direction.

Figure 2:
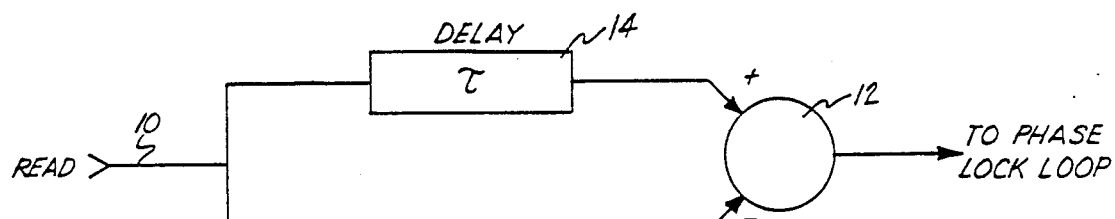
FIG. 2 shows a rough schematic of the comb filter of the present invention.

The solution to this problem is to provide a front end comb filter schematically shown in FIG. 2. The read signal is input to the comb filter on input 10 is split. One path is connected to one input of a differential amplifier 12. The other path is input to a delay circuit 14, the output of which is connected to the other input of the differential amplfier. The length of the delay is one half the period of the prerecorded clock. Thus the signal out of the differential amplifier is identical to the input signal for signals having a period equal to the prerecorded clock. However, a unipotential signal will negatively add with itself one-half clock period later. This converts the unipotential waveform into two waveforms having equal and opposite polarity. This signal stabilizes the drift in a phase lock loop coupled thereto by causing equal and opposite drifts.

Figure 1B:
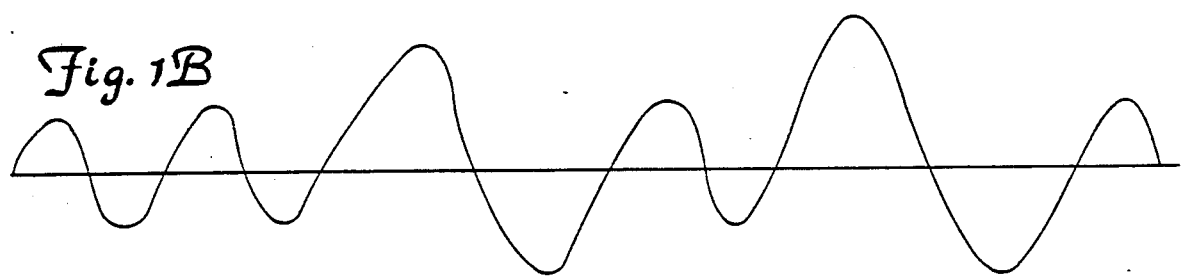
FIG. 1b shows the same read signal pattern after having been processed by the comb filter of the present invention.

The signal out of the comb filter of FIG. 2 for the waveform input shown in FIG. 1a is shown in FIG. 1b. The clock signal is unaffected by the comb filter and the unipotential data signals have each been converted into two equal and opposite polarity signals.

Figure 3:
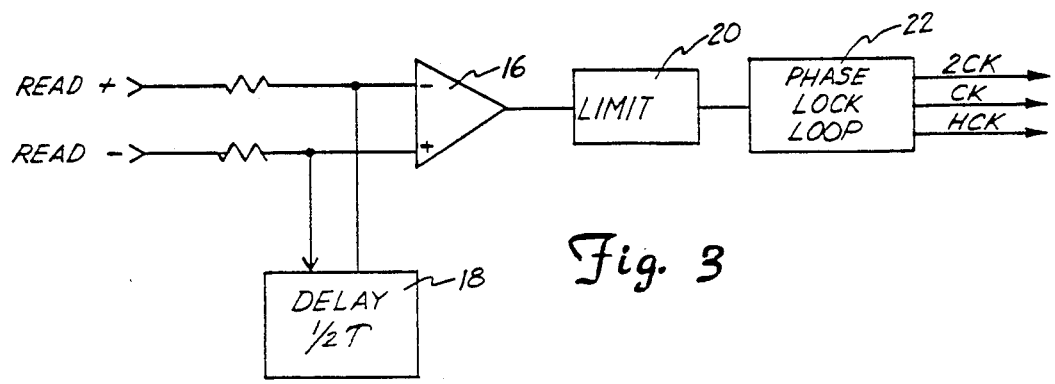
FIG. 3 shows a schematic of the preferred embodiment.

The preferred embodiment of the comb filter is shown in FIG. 3. The read signal is comprised of differential Read+ and Read− signals which are buffered and provided as inputs to to the opposite polarity inputs of differential amplifier 16, i.e., the Read+ signal is provided as an input to the inverting input of the differential amplifier and the Read− signal is provided to the non inverting input. This effectively reverses the polarity of the signal at the output of the differential amplfier. Thus the absence of a signal caused by a hole (a large signal on the Read− line) would appear as a large positive signal on the output of the differential amplifier. The Read− signal is additionally input to Delay 18, which delays the signal by one half the period of the prerecorded clock. The high impedance output of the Delay 18 is provided to the inverting input of the differential amplifier 16. The high impedance of the output prevents feedback of the Read+ signal to the inverting input of the differential amplifier 16.

It is important to note that the unipotential nature of the signal caused by the reading of a hole causes a signal to occur only on the Read− signal line. Thus a delay and connection to the opposite polarity input of the differential amplifier is unnecessary for the Read+ signal line.

The output of the differential amplifier is input to a limiter 20, which limits the amplitude of the signals caused by data holes to approximately that of the prerecorded clock.

The output of the limiter is then provided to a phase lock loop 22 which locks onto the prerecorded clock signal and outputs, in the preferred embodiment, signals CK, 2CK and HCK corresponding in frequency to that of the prerecorded clock, twice the frequency of the prerecorded clock and half the frequency of the prerecorded clock for use by the data decode electronics (not shown).

The enumeration of the elements of the preferred embodiment should not be taken as limitation on the scope of the appended claims, in which I claim:

1. A method that utilizes a comb filter for filtering read signals comprising prerecorded clock signals and data signals before inputting read signals to a phase lock loop, comprising:
   receiving analog read signals, said analog read signals including prerecorded clock signals and data signals and said analog read signals also including at least a first unipotential signal;
   inputting said analog read signals to delay means;
   delaying said analog read signals inputted to said delay means;
   combining in differential amplifier means said delayed analog read signals and said analog read signals;
   outputting from said differential amplifier means analog read signals, wherein said first unipotential signal substantially corresponds to equal and opposite portions of said outputted analog read signals;
   inputting said outputted analog read signals to a phase lock loop; and
   reducing drift in said phase lock loop due to the absence of said first unipotential signal.

2. A method, as claimed in claim 1, wherein:
   said step of delaying said analog read signals includes delaying said analog read signals inputted to said delay means by about one-half of the period of said prerecorded clock signal.

3. A comb filter for filtering read signals comprising prerecorded clock signals and data signals before inputting read signals to a phase lock loop, comprising:
   a source of analog read signals, said analog read signals including prerecorded clock signals and data signals, said analog read signals also including at least a first unipotential signal;
   delay means communicating with at least portions of said analog read signals for delaying said portions of said analog read signals by one-half the period of a prerecorded clock signal;
   differential amplifier means being responsive to said delay means and for combining said read signals outputted by said delay means with said analog read signals, wherein said differential amplifier means outputs analog read signals in which said first unipotential signal is substantially converted to portions of analog read signals having substantially equal magnitudes but opposite polarities; and
   phase lock loop means in communication with said differential amplifier means.

4. A comb filter, as claimed in claim 3, wherein:
   said phase lock loop means includes limiter means for limiting amplitudes of read signals outputted by said differential amplifier means to an amplitude substantially corresponding to that of a said prerecorded clock signal.

* * * * *